United States Patent [19]

Rozek et al.

[11] Patent Number: 5,685,424
[45] Date of Patent: Nov. 11, 1997

[54] PROTECTIVE RETAINER FOR A COMPACT DISC

[75] Inventors: Kurt Rozek, Portland; Dave Eide, West Linn, both of Oreg.

[73] Assignee: Rose City Paper Box, Inc.

[21] Appl. No.: 633,303

[22] Filed: Apr. 17, 1996

[51] Int. Cl.[6] ................................................. B65D 85/57
[52] U.S. Cl. ...................... 206/308.1; 206/310; 206/312; 206/493
[58] Field of Search ........................ 206/308.1, 309–313, 206/232, 492–495, 303

[56] References Cited

U.S. PATENT DOCUMENTS

| | | |
|---|---|---|
| 511,482 | 12/1893 | Williams . |
| 603,303 | 5/1898 | Washburne . |
| 655,696 | 8/1900 | Dowse . |
| 1,268,870 | 6/1918 | Moss . |
| 1,850,713 | 3/1932 | Fox . |
| 1,870,051 | 8/1932 | Johnson . |
| 3,530,981 | 9/1970 | Wienecke, Jr. . |
| 3,551,963 | 1/1971 | Mosher, Jr. et al. . |
| 3,896,929 | 7/1975 | Mills ........................................ 206/493 |
| 4,084,690 | 4/1978 | Pulse ........................................... 6/310 |
| 4,425,999 | 1/1984 | MacDonald et al. . |
| 4,674,632 | 6/1987 | Friedman . |
| 4,709,812 | 12/1987 | Kosterka ................................... 206/311 |
| 4,793,479 | 12/1988 | Otsuka et al. . |
| 4,874,085 | 10/1989 | Grobecker et al. . |
| 4,903,829 | 2/1990 | Clemens . |
| 5,062,526 | 11/1991 | Rudnick et al. ............................ 206/6.1 |
| 5,168,991 | 12/1992 | Whitehead et al. . |
| 5,188,229 | 2/1993 | Bernstein ................................... 206/310 |
| 5,188,230 | 2/1993 | O'Brien et al. . |
| 5,205,405 | 4/1993 | O'Brien et al. . |
| 5,219,417 | 6/1993 | O'Brien et al. . |
| 5,248,032 | 9/1993 | Sheu et al. . |
| 5,249,677 | 10/1993 | Lim . |
| 5,293,994 | 3/1994 | Antik ...................................... 206/387.1 |
| 5,332,089 | 7/1994 | Tillett et al. . |
| 5,333,728 | 8/1994 | O'Brien et al. . |
| 5,366,074 | 11/1994 | O'Brien et al. . |
| 5,379,894 | 1/1995 | Haas et al. . |
| 5,551,560 | 9/1996 | Weisburn et al. ......................... 206/308.1 |
| 5,593,030 | 1/1997 | Tell .......................................... 206/308.1 |
| 5,609,249 | 3/1997 | Cheng ...................................... 206/308.1 |

*Primary Examiner*—Jacob K. Ackun
*Assistant Examiner*—Luan K. Bui
*Attorney, Agent, or Firm*—Chernoff, Vilhauer, McClung & Stenzel

[57] ABSTRACT

A protective retainer for a planar disc having an outer peripheral edge, an information containing area, and a central portion defining an aperture. The protective retainer includes a first cover having a first surface and a second cover having a second surface. The first cover also has a first and second layer. A retaining device includes a flange that is interdisposed between and retained by the first and second layers in order to prevent the retaining device from inadvertently becoming detached from the protective retainer after repeated use. The retaining device includes an outwardly projecting retainer button that is adapted to be engageable to the aperture of the disc so as to maintain the relative position of the disc and the first surface. The retainer button is also resiliently deformably detachable from the aperture of the disc when pressure is exerted on the retaining device. The retainer button includes a pair of opposing upright curved walls, each having a curved base and a curved rim. The curved rims have a radius of curvature greater than its respective curved base and define respective chords. Each of the chords and curved rims together define the periphery of a pair of opposed shoulders. The retainer button includes a central channel interdisposed between and interconnecting shoulders. The channel exerts outwardly directed pressure on the curved walls to maintain an engaged disc in position, while also being resiliently deformable to permit the retainer button to engage to and detach from the aperture of the disc.

22 Claims, 5 Drawing Sheets

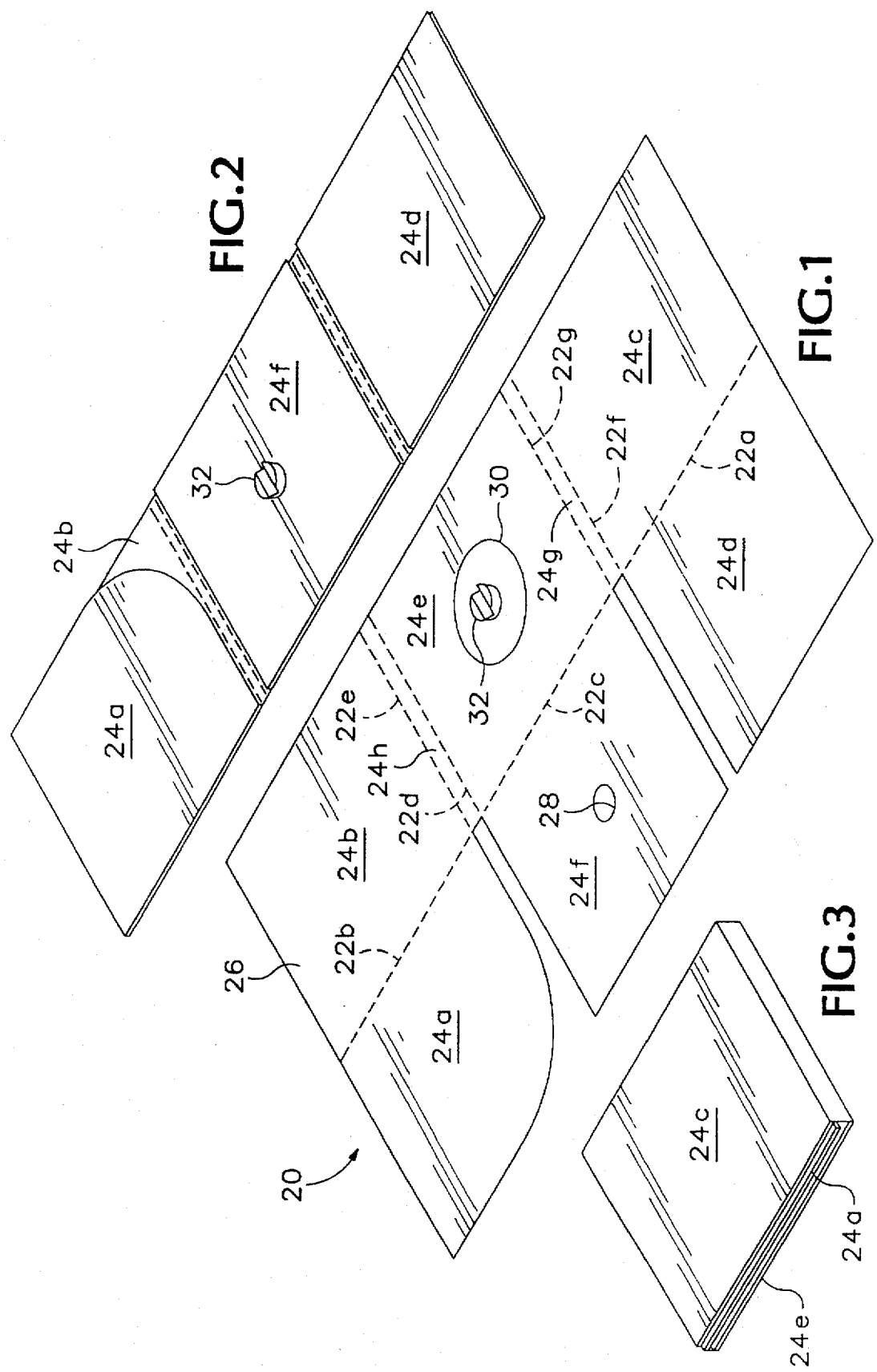

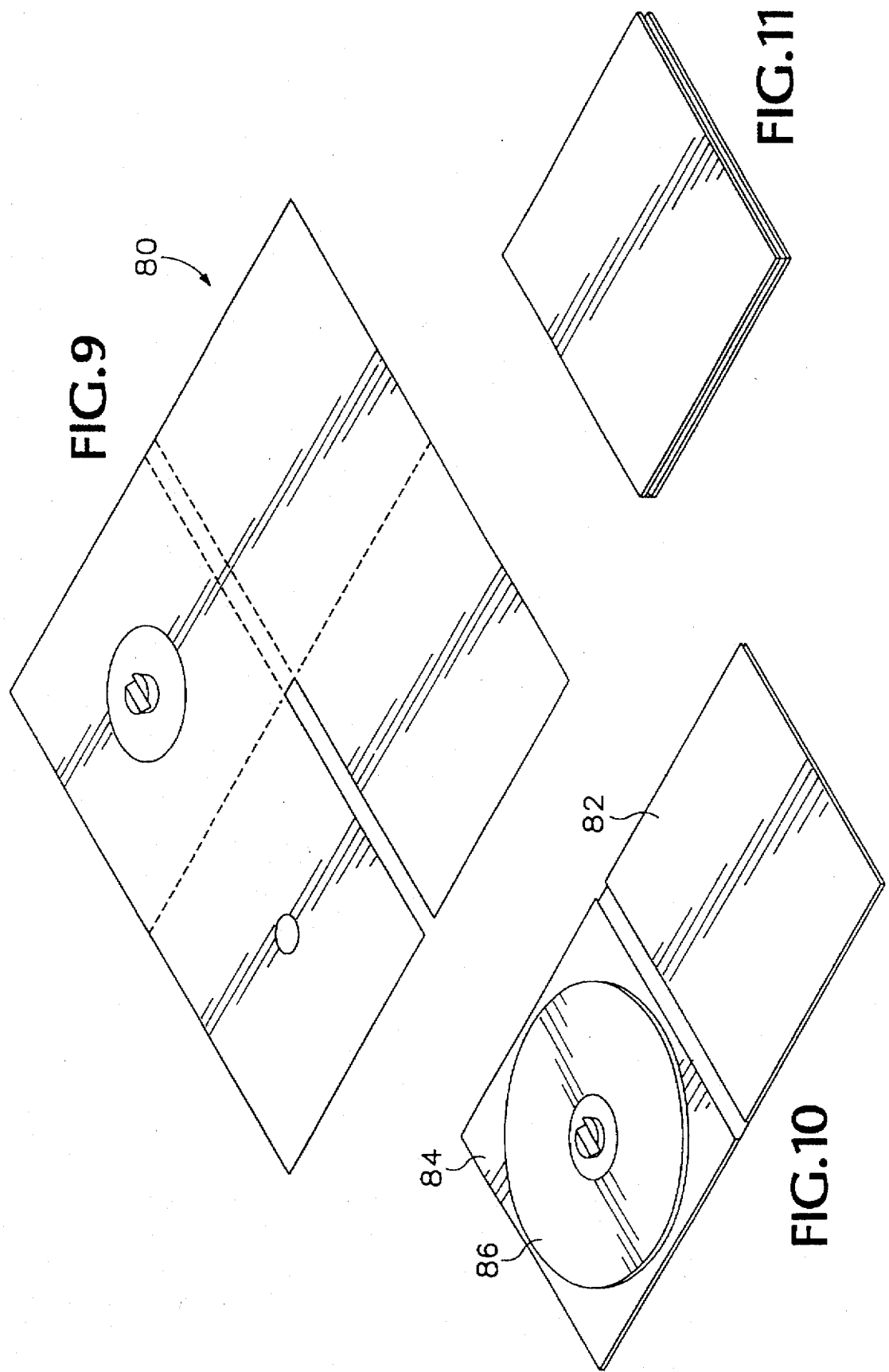

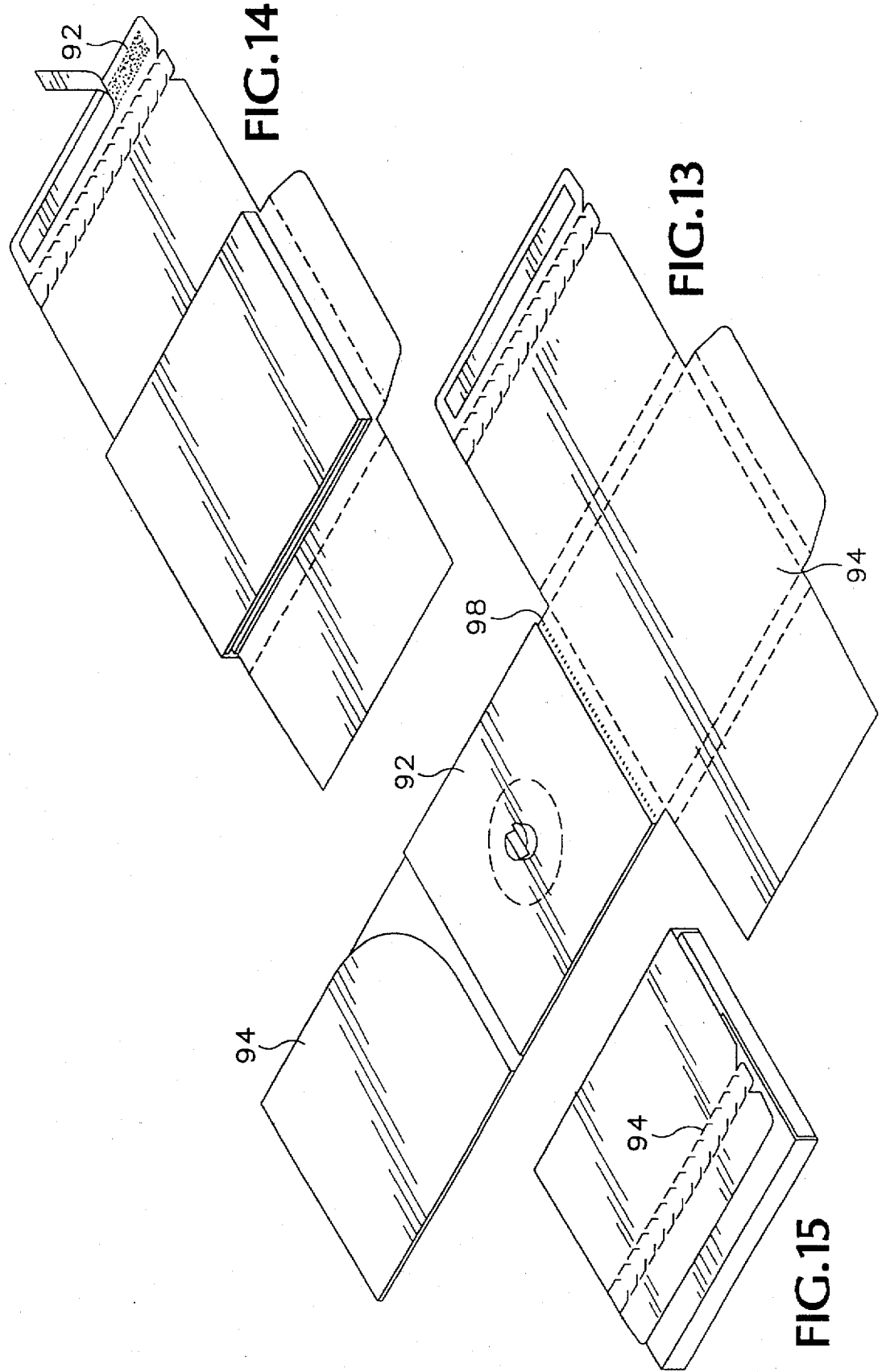

PROTECTIVE RETAINER FOR A COMPACT DISC

BACKGROUND OF THE INVENTION

The present invention relates to an improved compact disc holder. More particularly, the present invention relates to an improved retaining device and pliable protective retainer for a compact disc.

Digitally encoded discs are frequently used for storing digital data. Audio recording discs, commonly referred to as compact discs, provide a storage medium that permits the reproduction of high quality sound and has a potentially infinite life span. Audio/visual recording discs, commonly referred to as video compact discs or CD-ROMs, provide a storage medium for high resolution digital pictures in addition to audio information. Video compact discs also have a potentially infinite life span.

A central portion of the disc defines an aperture that allows the disc to be conveniently centered on a disc player. Immediately surrounding the central aperture are a pair of opposed, top and bottom, annular bearing surfaces containing no data in order to provide surfaces to engage a clamping mechanism for spinning the disc during playback on the disc player.

It has long been recognized that scratches in the protective layer will disturb the scanning process causing audible clicks and emission sounds to occur. When the protective layer is damaged extensively, the disc may not be scanned at all. Accordingly, protective retainers or containers are used to store and transport discs to avoid incurring unnecessary damage.

Clemens, U.S. Pat. No. 4,903,829; Lim, U.S. Pat. No. 5,249,677; Whitehead et al., U.S. Pat. No. 5,168,991; Grobecker et al., U.S. Pat. No. 4,874,085; and Otsuka et al., U.S. Pat. No. 4,793,479, all disclose containers for compact discs constructed from rigid plastic materials normally formed using an injection molding process that is relatively time consuming and requires high tooling costs. These plastic containers are also generally not recyclable, include plastic hinges that are prone to breaking, and the weight of the plastic incurs significant shipping costs.

O'Brien et al., U.S. Pat. No. 5,366,074; O'Brien et al., U.S. Pat. No. 5,188,230; O'Brien et al., U.S. Pat. No. 5,205,405; and O'Brien et al., U.S. Pat. No. 5,219,417, disclose several compact disc packages incorporating the combination of multiple panels of paperboard material with a plastic vacuum formed disc tray including upright sides to retain the compact disc therein. The upright sides of the plastic holder inhibit the ability to grip the edge of the disc when removing the disc from the package.

Tillett et al., U.S. Pat. No. 5,332,089, discloses a storage container for a compact disc that includes a plurality of non-rigid foldable panels. A cylindrical holder for a disc is constructed from a resiliently compressible material, such as foam, and is fixedly secured to the surface of one of the panels. After repeated use, foam does not maintain its shape reducing its ability to properly engage and secure the disc. Further, the foam has a tendency to become detached from the surface of the panel after repeated use.

What is desired, therefore, is a pliable protective retainer for a compact disc that is detachably engageable to a retaining device which does not have a tendency to become detached from the retainer. In addition, the protective retainer and retaining device should be inexpensive and recyclable.

SUMMARY OF THE PRESENT INVENTION

The present invention overcomes the aforementioned drawbacks of the prior art by providing a protective retainer for a planar disc having an outer peripheral edge, an information containing area, and a central portion defining an aperture. In a first aspect of the present invention, the protective retainer includes a first cover having a first surface and a second cover having a second surface. The first cover also has a first and second layer. A retaining device includes a flange that is interdisposed between and retained by the first and second layers in order to prevent the retaining device from inadvertently becoming detached from the protective retainer after repeated use. The retaining device is detachably engageable with the aperture of the disc. The first cover and the second cover are engageable with one another so as to enclose at least a portion of the disc between the first surface and the second surface while the disc is engaged by the retaining device. The first cover is constructed from a pliable material so as to enable the first cover to bend away from the disc while the disc is detached from the retaining device. The pliability of the first cover allows the edge of the disc to be easily grasped when detached from the protective retainer. In the preferred embodiment, the covers are constructed of paperboard material which is inexpensive and recyclable.

In another aspect of the present invention, the retaining device includes a retainer button that projects outwardly from a substantially flat surface, such as the first cover. The retainer button is adapted to be engageable to the aperture of the disc so as to maintain the relative position of the disc and the flat surface. The retainer button is also resiliently deformably detachable from the aperture of the disc when pressure is exerted on the retainer button.

In a further aspect of the present invention, the retainer button includes a pair of opposing upright curved walls, each having a curved base and a curved rim. The curved rims have a radius of curvature greater than their respective curved bases and define respective chords. Respective combinations of chords and curved rims together define the periphery of a pair of opposed shoulders. The retainer button includes a central channel interdisposed between and interconnecting the top shoulders together. Sloping sidewalls of the central channel exert outwardly directed pressure on the curved walls to maintain an engaged disc in position, while also being resiliently deformable to permit the retainer button to engage to and detach from the aperture of the disc.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a pictorial view of a partially assembled disc holder including a retaining device and a blank of flexible material with score lines.

FIG. 2 is a pictorial view of an assembled disc holder of FIG. 1.

FIG. 3 is a pictorial view of the folded disc holder of FIG. 1.

FIG. 9 is a pictorial view of an unassembled retaining device shown in FIG. 1 and an alternative blank of flexible material with score lines.

FIG. 10 is a pictorial view of an assembled disc holder of FIG. 9.

FIG. 11 is a pictorial view of the folded disc holder of FIG. 9.

FIG. 13 is a pictorial view of a partially assembled disc holder of FIG. 12.

FIG. 14 is a pictorial view of a partially assembled disc holder of FIG. 13.

FIG. 15 is a pictorial view of the folded disc holder of FIG. 12.

DETAILED DESCRIPTION OF THE PREFERRED EMBODIMENT

Figure 4:
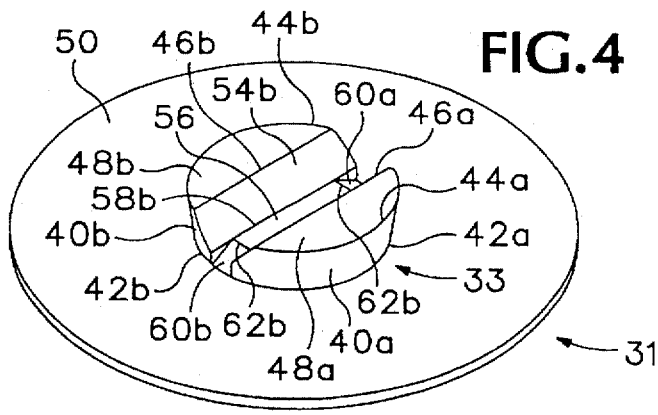
FIG. 4 is a pictorial view of an alternative embodiment of a retaining device.

Referring to FIG. 1, a protective disc holder or protective retainer 20 is constructed from a blank of paperboard material with score (fold) lines 22a–22g defining eight separate portions 24a–24h. Turning to FIG. 2, left end portion 24a is folded over and adhered along edge 26 to left end portion 24b to create a pocket 25 suitable for storing printed materials therein, such as instructions. Right end portion 24d is folded over and adhered to right end portion 24c to form a right end cover 27. Central portion 24f defines a centrally located circular opening 28, and the central portion 24f is folded over and adhered to central portion 24e with opening 28 encircling a protruding retainer button 32 of a retaining device 30. The retaining device 30 includes a flange 34 that extends outwardly from the protruding retainer button 32. The central portions 24e and 24f combine to prevent the retaining device 30 from inadvertently detaching from the disc holder 20 after repeated use, and maintain its proper position.

In addition, the disc holder 20 is suitable for assembly with automated machinery to fold and adhere the portions of the disc holder 20 together while properly positioning the retaining device 30 therein. The retainer button 32 of the retaining device 30 is adapted to detachably engage the aperture of the disc, as described later. The disc holder 20 is preferably larger than the periphery of the disc so that the disc does not extend beyond the holder where it could be damaged. Referring to FIG. 3, the pocket 25 is folded over the central portion 24f and the right end cover 27 is folded over the pocket 25. Side portions 22g and 22h form the right and left ends, respectively.

The disc holder 20, and in particular the central panel 24f, is constructed of a pliable semi rigid material, such as paperboard. The right end portions 24c, 24d and left end portions 24a, 24b may be constructed from a single layer of paperboard material, if desired. Alternatively, the central portion may include an alternative engaging system for the flange 34 to maintain it in position. The paperboard is typically coated for printing on both surfaces to provide an attractive color printed package.

Figure 5:
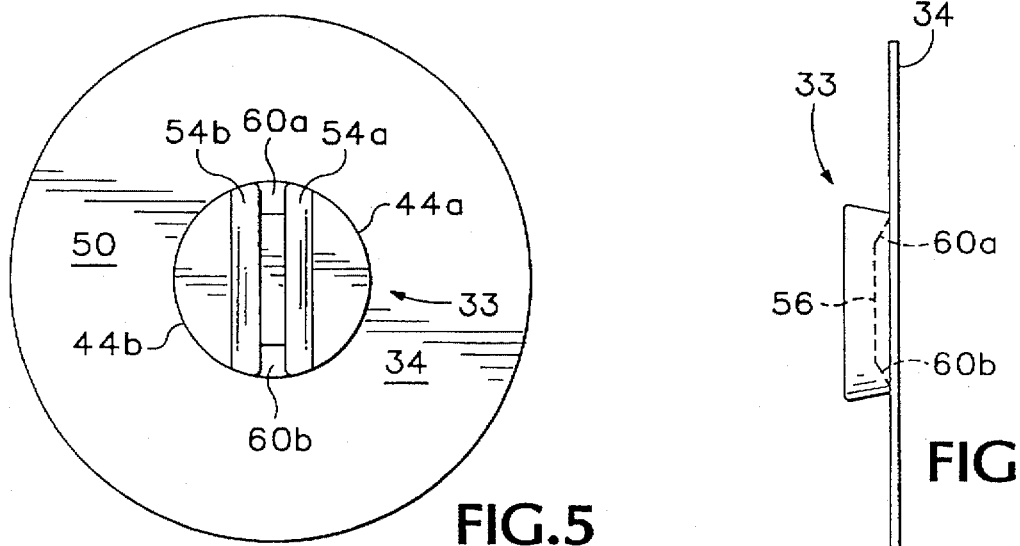
FIG. 5. is a top view of the retaining device shown in FIG. 4.
Figure 8:
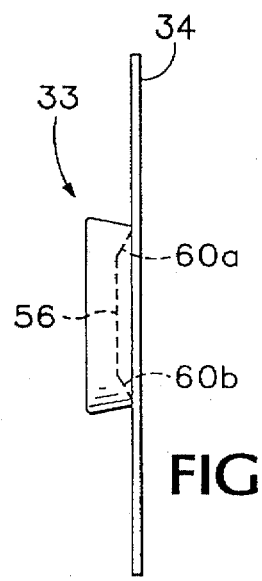
FIG. 8 is a side view of the retaining device shown in FIG. 4 detailing a pair of chamfers.
Figure 6:
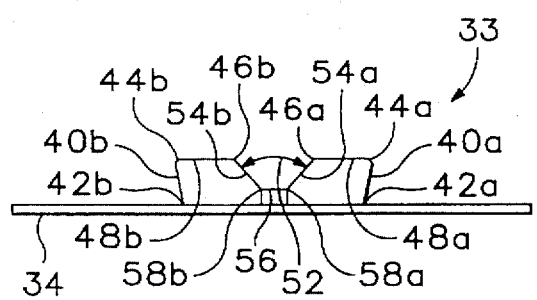
FIG. 6. is a side view of the retaining device shown in FIG. 4 detailing a v-shaped channel.
Figure 7:
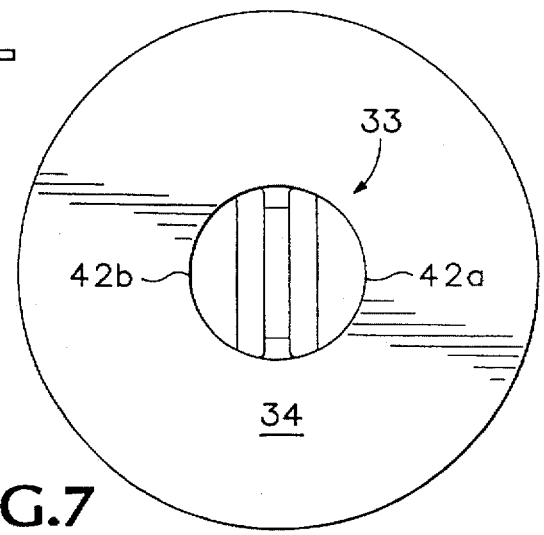
FIG. 7 is a bottom view of the retaining device shown in FIG. 4.

Referring to FIGS. 4–8, a preferred embodiment of the retaining device 31 is shown that includes a pair of chamfers, as described later. The retaining device 31 has a pair of opposing upright curved walls 40a and 40b. The upright curved walls 40a and 40b are preferably circular with the same radius of curvature. Each of the curved walls 40a and 40b has a curved base 42a and 42b and a curved rim 44a and 44b. The radius of curvature each of the curved rims is greater than the radius of curvature of its respective curved base 42a and 42b. Accordingly, the curved walls 40a and 40b together resemble a segment of an inverted cone so that the aperture of the disc is securely retained thereon, as described below. Each of the curved rims 44a and 44b defines a respective chord 46a and 46b, which together with the respective rim 44a and 44b define the periphery of a pair of opposed shoulders 48a and 48b. The shoulders 48a and 48b are preferably flat on top and parallel to the flange 34. A central channel 52 is interposed between and interconnects the shoulders 48a and 48b. The central channel 52 is preferably v-shaped with a pair of inclined flat sides 54a and 54b and a generally flat channel floor surface 56. The angle between the inclined sides 54a and 54b of the central channel 52 is preferably between 80 and 160 degrees.

To engage the aperture of the disc on the retaining device, pressure from the annular opening of the disc is exerted simultaneously on the curved rims of both shoulders 48a and 48b. Such forces cause the shoulders to incline downwardly and inwardly toward the central channel 52. The inclined sides 54a and 54b are hinged at their respective joints 58a and 58b with the floor 56 as the shoulders 48a and 48b are inclined inwardly. When the top portions 48a and 48b are inclined, the distance between the curved rims 44a and 44b is sufficiently decreased to permit the aperture of the disc to pass the curved rims and be positioned near the lower end of the curved walls 40a and 40b. The disc is preferably pressed downwardly to the curved bases 42a and 42b.

With the disc in position near the base of the curved walls, the pressure on the shoulders 48a and 48b is relieved allowing the channel 52, and in particular the combination of the inclined sides 54a and 54b, and floor 56, to exert outwardly directed pressure locking the curved walls 40a and 40b against the aperture of the disc. The angle of incline of the inclined sides 54a and 54b, and the width of the 46 are selected so that sufficient pressure is exerted to retain the disc on the retaining device 30. If the pressure exerted by the channel 52 is insufficient, then the disc may inadvertently detach from the retaining device. In contrast, if the pressure exerted by the channel 52 is too great, then it may be difficult to engage and to disengage the disc from the retaining device.

The retaining device is preferably formed with a vacuum forming thermo process, which is relatively inexpensive, fast, and permits several retaining devices to be molded simultaneously using one mold.

It is difficult to accurately control the precise thickness of the plastic material across the retaining device, which may result in variations in the pressure exerted by channels created with the same mold. To decrease the variations in pressure as a result of different material thicknesses, a pair of chamfers 60a and 60b are molded into the floor 56. The chamfers 60a and 60b provide a pair of transverse edges 62a and 62b aligned at an angle to the channel floor 56 to further resist deformation of the channel 52. Varying of the length and angle of the chamfers 60a and 60b allows greater control over the pressure, both resisting deformation when engaging and disengaging the disc, and the outward pressure exerted by the curved walls.

To detach the disc from the retaining device, pressure is simultaneously exerted on the shoulders 48a and 48b disengaging the curved walls 40a and 40b from forceably engaging the aperture of the disc. To complete removal of the disc from the retaining device, upwardly directed pressure is exerted on the outer peripheral edge of the disc. The pliable material of the protective retainer will flex away from the disc permitting easier access to the peripheral edge of the disc. With a substantially flat central panel, no upright edges interfere with the ability to grasp the edge of the disc at any desired location.

The flange 34 is secured within the two layers of pliable paperboard material 24e and 24f. When pressure is exerted on the top portions 48a and 48b the flange 50 will flex in a concave manner about an axis substantially defined by the channel, which assists in permitting the curved walls 40a and 40b, and in particular the curved rims 44a and 44b, to move toward one another when engaging and disengaging the disc.

The retaining device shown in FIGS. 4–8 is adapted especially for audio compact discs and has the following dimensions:

| | |
|---|---|
| 1.625 inches | Diameter of the flange |
| 0.612 inches | Diameter of the curved rims |
| 0.590 inches | Diameter of the curved bases |
| 0.413 inches | Length of the channel floor |
| 0.080 inches | Width of the channel floor |
| 0.250 inches | Distance between chords |
| 0.050 inches | Distance between the top of the flange and the top of the channel floor |
| 0.170 inches | Distance between the bottom of the flange and the top of the top portion |
| 0.150 inches | Distance between the top of the flange and the top of the top portion |
| 80 degrees | Angle between the inclined sides |
| 24 degrees | Angle of the incline of the chamfers |

Figure 12:
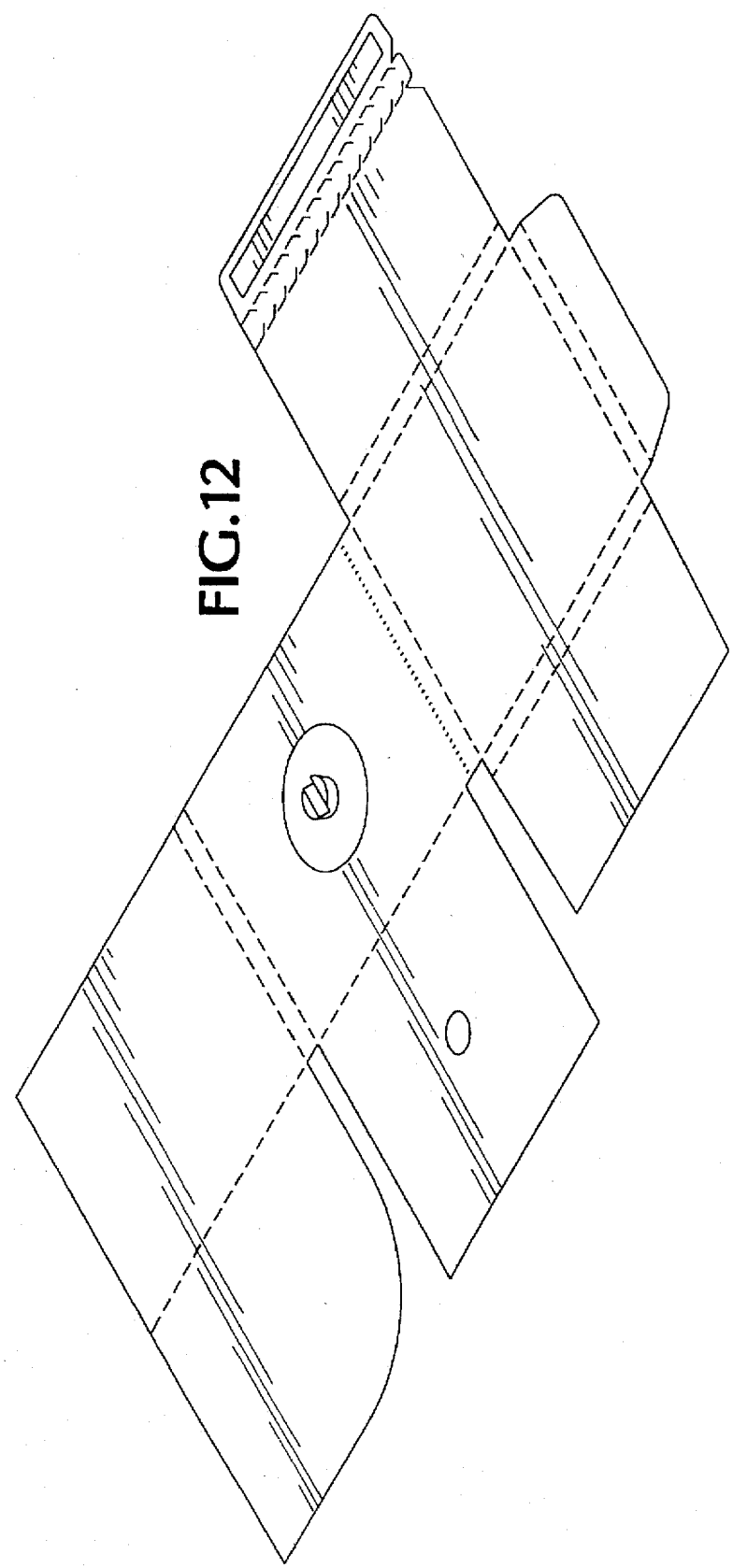
FIG. 12 is a pictorial view of an unassembled retaining device shown in FIG. 1 and an alternative blank of flexible material with score lines.

FIGS. 1–3 and 9–15 show an alternative retaining device without the chamfer as shown in FIGS. 4–8.

Referring to FIGS. 9–11 an alternative protective retainer 80 is shown that includes a central portion 82 and an end portion 82 that fold together like a book to secure and protect a disc 86 therein.

Referring to FIGS. 12–15 another protective retainer 90 is shown particularly suited for mailing a disc therein. The retainer 90 is folded together as shown with a adhesive material 92 securing the retainer together. A rip portion 94 is pulled in order to open the retainer 90. Thereafter, the right end portion 96 may be removed by tearing along perforation 98 leaving the retainer 96 similar to that shown in FIGS. 10 and 11.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A protective retainer for a planar disc having an outer peripheral edge, an information containing area, and a central portion defining an aperture, said protective retainer comprising:

(a) a first cover having a first layer, a second layer, and a first surface;
   (b) a second cover having a second surface;
   (c) a retaining device in contact with said first cover and detachably engageable with said aperture of said disc;
   (d) said first cover and said second cover engageable with one another so as to enclose at least a portion of said disc between said first surface and said second surface while said disc is engaged by said retaining device;
   (e) said retaining device including a flange, said flange interdisposed between and retained by said first and second layer of said cover; and
   (f) said first cover constructed from a pliable material, so as to enable said first cover to bend away from said disc while said disc is engaged by said retaining device.

2. The protective retainer of claim 1 further comprising:
   (a) said retaining device adapted to be engageable to said aperture of said disc so as to maintain the relative position of said disc and said first surface; and
   (b) said retaining device detachable from said aperture of said disc when pressure is exerted on said retaining device.

3. The protective retainer of claim 1 wherein said first and second layers are constructed of paperboard material.

4. The protective retainer of claim 1 wherein said first surface is constructed of paperboard material.

5. The protective retainer of claim 1 wherein said first surface is substantially flat.

6. The protective retainer of claim 5 wherein said first surface includes no upright edges which would interfere with grasping the edge of the disc at any desired location.

7. The protective retainer of claim 1 wherein said flange is substantially flat, said retaining device further including a central projecting retainer button for engaging said aperture of said disc.

8. The protective retainer of claim 1 wherein said retaining device includes a central projecting retainer button comprising:
   (a) a pair of opposing upright curved walls, each of said walls having a curved base and a curved rim;
   (b) each of said curved rims having a radius of curvature greater than its respective curved base;
   (c) each of said curved rims defining a chord, each of said chords and said respective rims together defining the periphery of a pair of opposed shoulders; and
   (d) said retaining device including a central channel interposed between and interconnecting said shoulders.

9. The protective retainer of claim 8 wherein said central channel defines an axis and said flange is bendable about said axis.

10. The protective retainer of claim 8 wherein said channel has a pair of inclined surfaces.

11. The protective retainer of claim 10 wherein said channel includes an elongate substantially flat floor.

12. The protective retainer of claim 11 wherein said floor includes a pair of chamfers angularly disposed with respect to said floor.

13. A protective retainer for a planar disc having an outer peripheral edge, an information containing area, and a central portion defining an aperture, said protective retainer comprising:

(a) a retaining device having a retainer button projecting outwardly from a substantially flat surface;
   (b) said retaining device adapted to be engageable to said aperture of said disc so as to maintain the relative position of said disc and substantially flat surface;
   (c) said retaining device detachable from said aperture of said disc when pressure is exerted on said retaining device;
   (d) said substantially flat surface including a first layer and a second layer, said retaining device including a flange, said flange interdisposed between and retained by said first and second layer; and (e) said substantially flat surface constructed from a pliable material so as to enable said surface to bend away from said disc while said disc is detached from said retaining device.

14. The protective retainer of claim 13 wherein said first and second layers are constructed of paperboard material.

15. The protective retainer of claim 13 wherein said substantially flat surface is constructed of paperboard material.

16. The protective retainer of claim 13 wherein said retaining device further comprises:

(a) a pair of opposing upright curved walls, each of said walls having a curved base and a curved rim;

(b) each of said curved rims having a radius of curvature greater than its respective curved base;

(c) each of said curved rims defining a chord, each of said chords and said respective rims together defining the periphery of a pair of opposed shoulders; and (d) said retaining device including a central channel interposed between and interconnecting said shoulders.

17. The protective retainer of claim 16 wherein said channel has a pair of inclined surfaces.

18. The protective retainer of claim 17 wherein said channel includes an elongate substantially flat floor.

19. The protective retainer of claim 18 wherein said floor includes a pair of chamfers angularly disposed with respect to said floor.

20. The protective retainer of claim 13 wherein said first surface includes no upright edges which would interfere with grasping the edge of the disc at any desired location.

21. The protective retainer of claim 13 wherein said flange is substantially flat, said retainer button adapted to engage said aperture of said disc.

22. The protective retainer of claim 13 wherein a central channel defines an axis and said flange is bendable about said axis.

* * * * *